Sept. 28, 1943.  A. M. CAMERON  2,330,555
STOP MOTION MECHANISM FOR DIE PRESSES
Filed Sept. 9, 1940  3 Sheets-Sheet 1
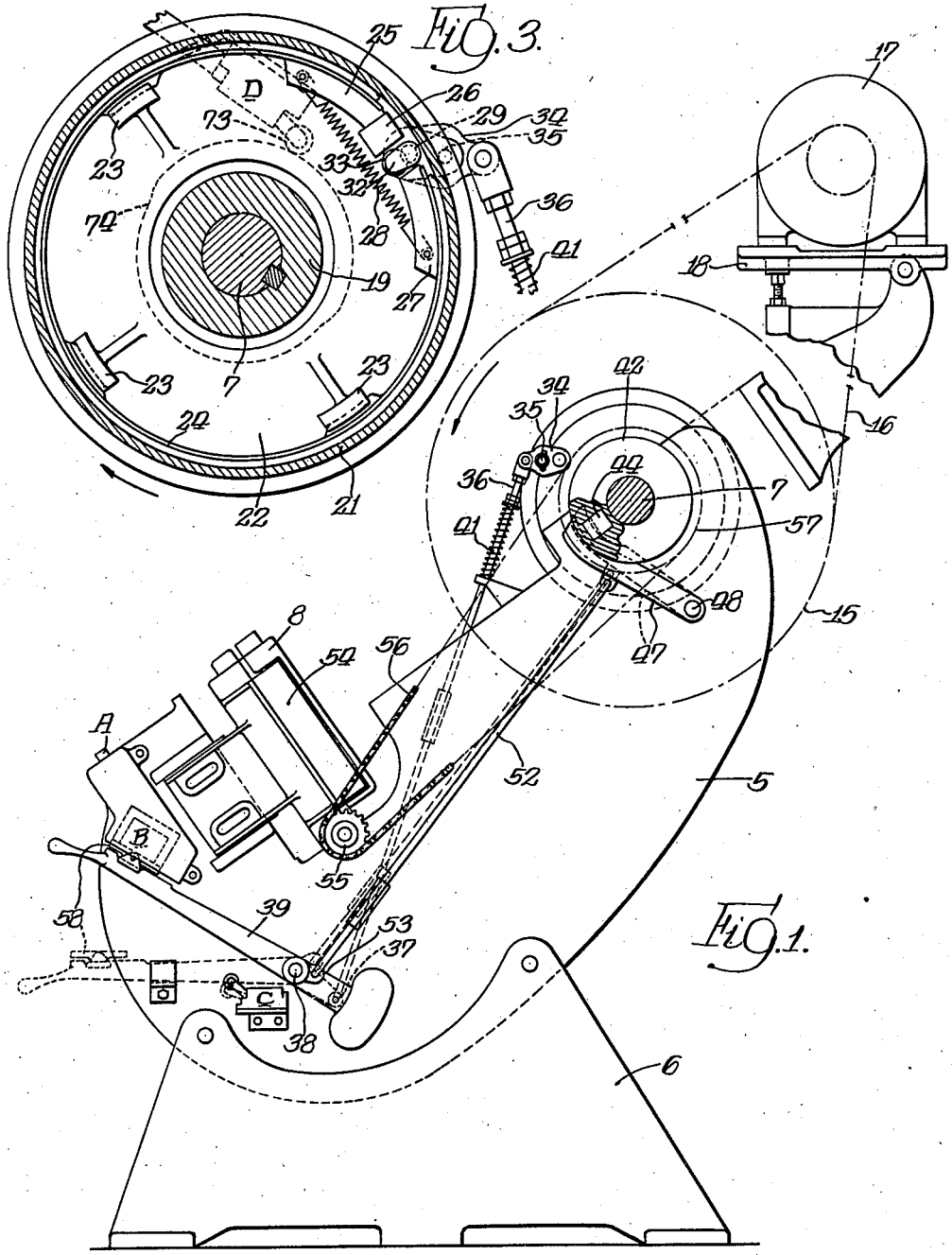
INVENTOR.
Allan M. Cameron,
BY

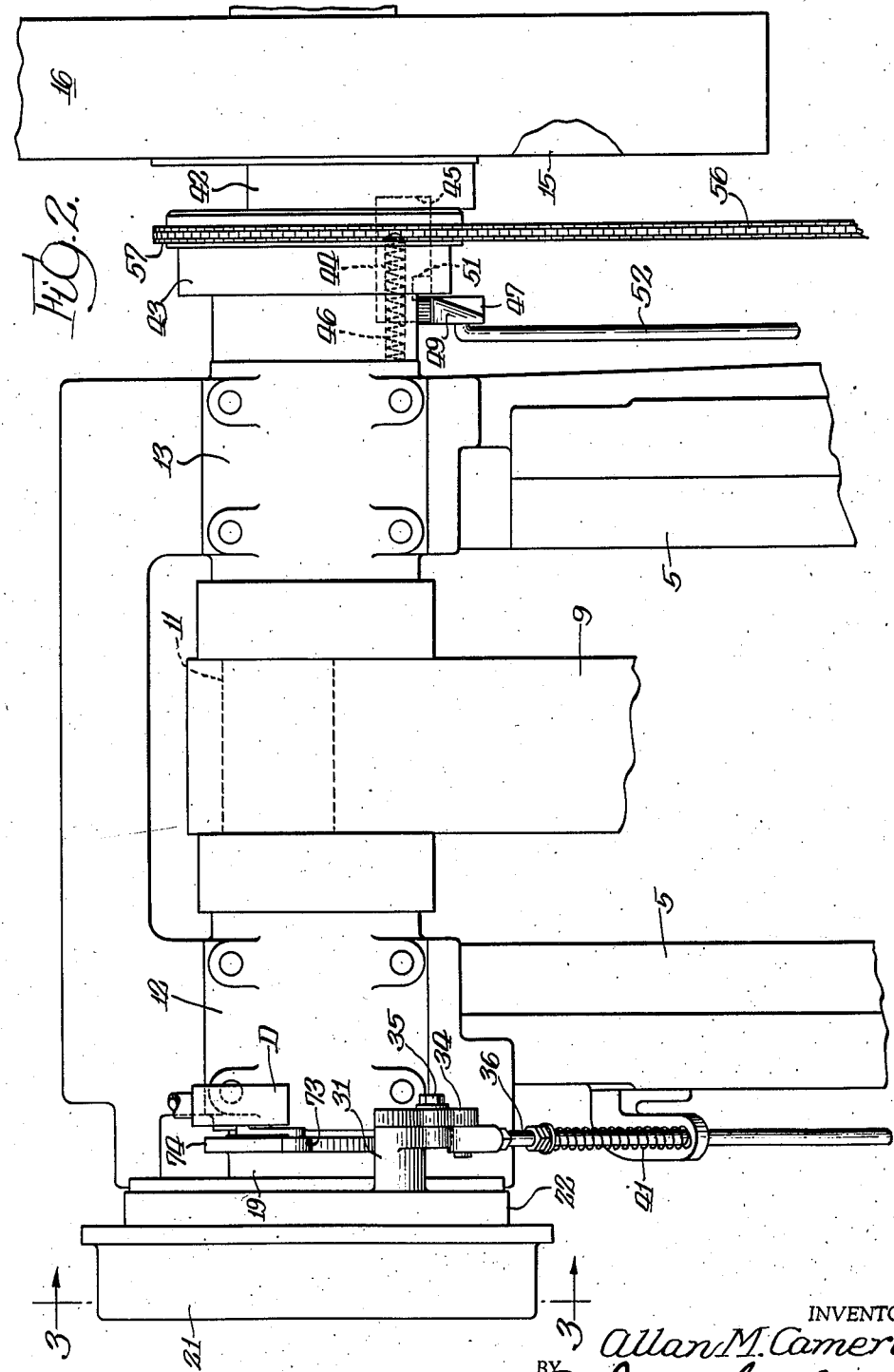

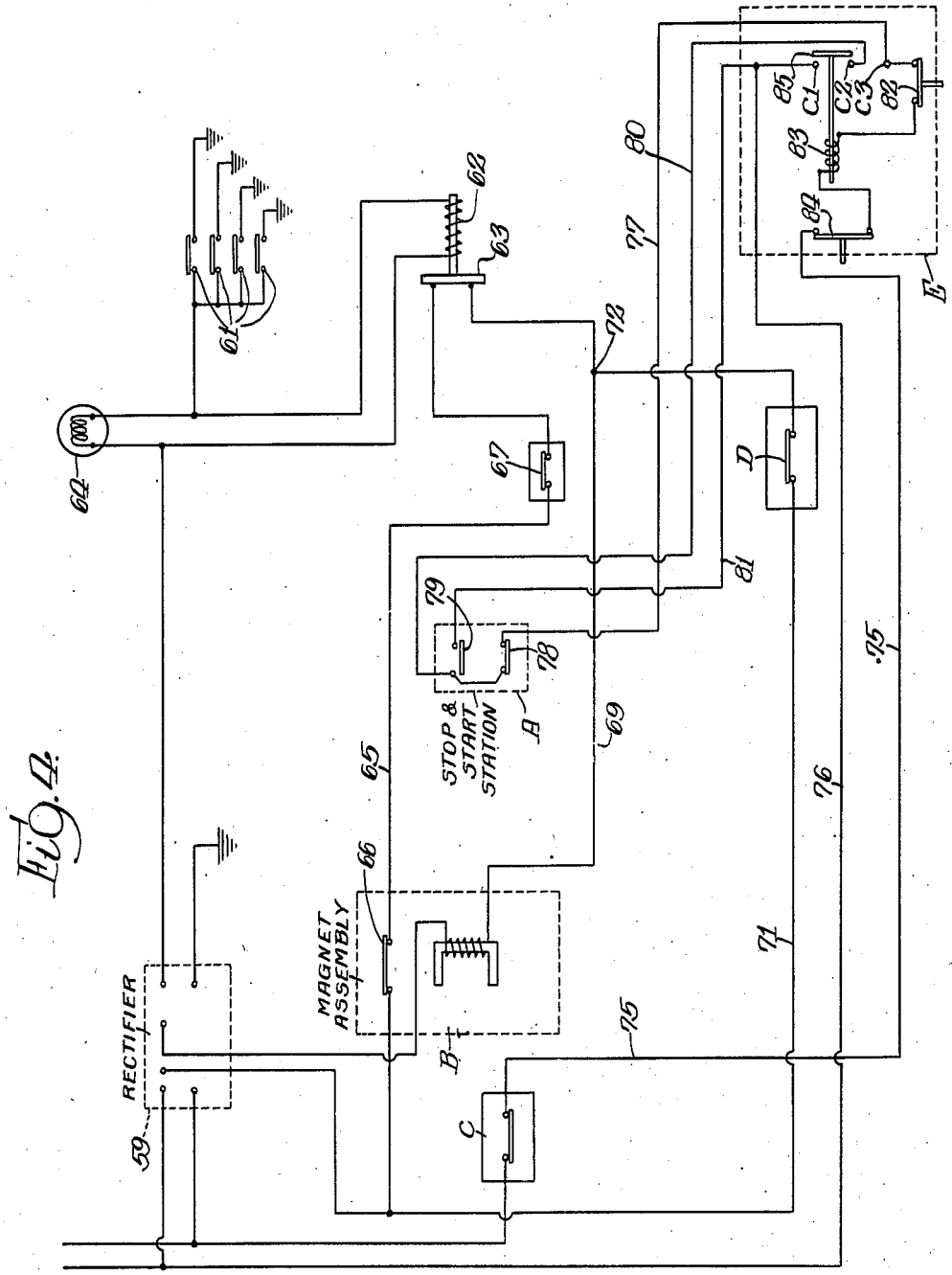

Patented Sept. 28, 1943

2,330,555

UNITED STATES PATENT OFFICE 2,330,555

STOP MOTION MECHANISM FOR DIE PRESSES

Allan M. Cameron, Chicago, Ill., assignor to Cameron Can Machinery Co., Chicago, Ill., a corporation of Illinois Application September 9, 1940, Serial No. 355,987

3 Claims. (Cl. 192—144)

This invention relates to stop motion mechanism, particularly adapted for high speed machines, and while the principles thereof may be employed on machines of various characters, my invention is here shown for illustrative purposes as embodied in a high speed automatic die press.

Presses of this character are customarily equipped with and driven through a heavy fly-wheel which steadies the operation of the machine, but the momentum of the wheel is such that it cannot be quickly stopped. Consequently, a clutch is employed between the fly-wheel and the main shaft of the press which when unclutched will permit the press to be quickly brought to rest. A clutch of the type here employed is illustrated in prior Patent No. 1,541,760.

Such a clutch is designed to bring the press to rest in a predetermined position with the movable die elevated so that both the movable and stationary dies are accessible. If, however, the clutch pin be withdrawn while the die press shaft is revolving at full speed in a high speed machine, the impact of the clutch pin against the abutment shoulder of the withdrawing shoe or wedge will be so violent as to injure the parts, and on occasion the rebound is so great as to permit the clutch pin to again re-engage with the fly-wheel, thereby adding to the danger of injury to the machine.

One of the purposes of my present invention is to provide a stop motion mechanism which will be so controlled by the operation of the press that it will become operative only when the moving parts of the press are in a predetermined position. Speaking more specifically, my invention is designed to throw the starting and stopping lever to "off" position, move the clutch pin wedge into the path of the clutch pin, and apply braking force to the main shaft of the machine immediately after the clutch pin has passed the wedge so that nearly a full revolution of the shaft can be utilized for braking purposes before the clutch pin will be acted upon by the wedge. In this manner the press is slowed down before the clutch pin is withdrawn, thereby reducing the stopping shock on the parts to a minimum.

If in starting the press the fly-wheel were permitted to attain a high speed before the clutch pin was released and permitted to engage with the wheel, a violent and injurious shock would be imparted to the shaft and moving parts. Another purpose of my invention is to obviate such injurious shocks by the provision of means which insures the release of the clutch pin simultaneously with the starting of the fly-wheel so that it is impossible for said wheel to attain any considerable momentum before the clutch pin connects it to the main shaft of the press.

Other purposes and advantages of my invention will be apparent as the same becomes better understood by reference to the following description when considered in connection with the accompanying drawings.

Referring to the drawings,

Fig. 1 is a side elevation, partially in section, of a press equipped with my invention;

Fig. 2 is a fragmentary elevation looking toward the right at Fig. 1;

Fig. 3 is a sectional view on the line 3—3 of Fig. 2; and

Fig. 4 is a wiring diagram showing the circuits included in the mechanism.

From the drawings, it will be observed that the body 5 of the machine supported upon the base 6 carries the main shaft 7, and the stationary die 8 across which the work is fed in a well-known manner. The movable die (not shown) which is reciprocable toward and from the stationary die is operated by the connecting rod 9 connected at its upper end to be reciprocated by the crank 11 formed intermediate the ends of the shaft 7. This shaft is journalled in bearings 12 and 13 carried by the body 5 and has loosely mounted thereon at one end a heavy fly-wheel 15 adapted to be driven through a belt 16 or otherwise from an electric motor 17 mounted upon a suitable supporting bracket 18.

A hub 19 keyed to the opposite end of the shaft 7, as illustrated in Fig. 3, carries a brake drum 21 which revolves with the shaft. An annular disk-shaped member 22 stationarily mounted on the machine body in proximity to the open inner end of the brake drum is provided with a plurality of outwardly projecting guides 23 disposed radially within the brake drum, which guides carry an expansible, circular brake shoe 24. One end of this brake shoe is secured to a plate 25 which in turn is anchored through a head 26 to the member 22. The opposite end of the shoe carries a member 27 which is normally drawn toward the plate 25 by a tractile spring 28 to withdraw the shoe from engagement with the drum, as illustrated in Fig. 3. A shaft 29 journalled in a bearing 31 projecting outwardly from the member 22 is provided at its inner end with a crank 32 equipped with a roller 33 adapted to engage the end of plate 27 and expand the shoe into braking engagement with the surrounding drum when the shaft 29 is rocked in a counter-clockwise direction viewing Fig. 3. At its outer end, the shaft 29 is provided with an arm 34 slidably held against displacement by a guide bolt 35 and connected at its outer end with a link 36, the lower end of which is connected with an arm 37 fixed on a shaft 38 extending transversely of the body 5. Upon the opposite end of shaft 38 is mounted the starting and stopping lever 39. When this lever is disposed in the starting and running position, shown in full lines in Fig. 1, the brake band or shoe 24 is in inoperative position, as shown in Fig. 3, but when the lever assumes the dotted line position shown in Fig. 1, the brake band is expanded to engage the surrounding drum and exert a braking action upon the rotation of the shaft 7. The application of the brake is made effective by the action of the coiled expansion spring 41.

Near its opposite end upon which the hub 42 of the fly-wheel 15 is rotatably mounted, the main shaft is provided with a collar 43 in which there is slidably disposed a clutch pin 44 normally urged outwardly by means of an expansion spring 46 into engagement in a socket 45 formed in the inner face of the hub 42. A clutch shoe or wedge 47 pivoted to the machine frame at 48 is provided toward its free end with an inclined face 49, so that the shoe is in effect wedge shaped. When the wedge end is disposed in the path of travel of the clutch pin 24, it enters a notch or transverse groove 51 in the clutch pin so that as the clutch pin moves along the wedge it is withdrawn from the socket 45, thus unclutching the wheel from the shaft. The clutch shoe is connected by a link 52 with the hand lever 39 or with a short arm 53 fixed on the shaft 38 on which the lever 39 is also fixedly mounted. Since both the clutch shoe 47 and the brake band 24 are controlled by the lever 39, it will be apparent that when the lever is in its "start and run" position, as shown in Fig. 1, the clutch shoe will be in inoperative position and the brake band will be released. When, however, the lever is moved to the dotted line position shown in Fig. 1, which is its "off" position, the clutch shoe will be moved from the full line position shown in this figure to the dotted line position in the path of the clutch pin and the brake band will be simultaneously expanded to apply its braking force to the main shaft.

In the type of machine shown, a pair of scrap feed and delivery rolls, one of which is designated 54, are driven through suitable bevel gears from a sprocket wheel 55 which in turn is driven by a chain 56 from a drive sprocket wheel 57 on the main shaft.

The press is equipped with a plurality of detectors adapted upon the detection of abnormal running conditions, such as the feeding of two blanks at a time or the buckling of a blank or a stoppage of the discharge chute, to open an electric circuit for the purpose of stopping the press. These detectors may be of any preferred construction, and since they are common in the art a diagrammatic showing is deemed to be sufficient. As illustrative of the structure of detectors of this character, reference may be had to Patent No. 1,515,774, if desired.

The start and stop lever 39 is influenced by gravity and by the spring 41 into the "off" position shown in dotted lines in Fig. 1 and is held in "on" position shown in full lines by an electromagnet B which when energized will hold the armature 58 carried by the lever with sufficient force to maintain the lever in "on" position until the electric circuit by which the magnet is energized becomes opened. To insure against the opening of this circuit except at a predetermined position of the drive shaft 7 in which the clutch pin has just passed the clutch shoe 47, thus leaving the greater part of one revolution of the shaft available for the braking action of the brake before the clutch pin is withdrawn, I prefer to employ the circuits disclosed in the wiring diagram of Fig. 4, to which reference will now be made.

These circuits preferably comprise a 110 volt A. C. pilot circuit, a 110 volt D. C. magnet circuit, and a 24 volt A. C. detector circuit. The conversion of the A. C. current into the suitable D. C. magnet and detector circuits being effected through a rectifier 59 of suitable construction.

The detector circuit includes a plurality of normally open detector switches 61 each adapted to be closed upon the occurrence of an abnormality in a manner exemplified by Patent No. 1,515,774, to which reference has previously been made. This circuit includes an electro-magnet 62 adapted when energized to withdraw the contactor 63 and open one leg of the magnet circuit. A pilot light 64 in the detector circuit gives a signal whenever the detector circuit is closed. The detector circuit is normally open through all of the detectors 61, but in the event of an abnormality in operation which closes one or more of these detectors, the circuit is closed to energize the electromagnet 62 and open the circuit which includes the contactor 63.

The 110 volt D. C. magnet circuit receives its current through the rectifier and includes the electromagnet B which when energized holds the start and stop lever 39 in the start and running position shown in Fig. 1. One leg of the magnet circuit comprises the wiring 65 in which is included a manually operable stop switch 66 at the front of the press, a manually operable stop switch 67 at the back of the press, the contactor 64, and the line 69 extending from contactor 63 to the rectifier 59, and including the electromagnet B. This leg of the circuit may be broken at will by manual manipulation of switches 66 or 67, or automatically broken by withdrawal of contactor 63 upon closure by an abnormality of the detector circuit.

The magnet circuit includes another line 71 extending from the rectifier to a point of connection with line 69 at 72. This line 71 includes a limit switch D which is alternately opened and closed at each revolution of the main shaft 7. By reference to Figs. 3 and 2, it will be observed that the switch D is mounted above the main shaft, preferably near the brake drum end, and comprises a follower 73 riding on a cam 74 mounted on the main shaft 7. At each revolution of this shaft, the switch D is alternately opened and closed by the cam 74, thus breaking the circuit through the line 71 at a predetermined rotative position of the shaft. The cam 74 and the switch D are so set that the switch D is opened immediately after the clutch pin has passed the clutch shoe 47.

In normal operation, the magnet circuit remains closed through lines 65 and 69 energizing magnet B and holding the lever 39 in running position. This circuit is not interfered with by the intermittent opening of the cam actuated switch D. In the event, however, of the line 65 being opened, either manually through stop switches 66 or 67, or automatically by withdrawal of contactor 63 upon closure of the detector circuit, the magnet B remains energized through the circuit including the lines 69 and 71 until the switch D is opened, whereupon magnet B is de-energized. Lever 39 immediately moves to the "off" position illustrated in dotted lines in Fig. 1, brake 24 is applied to the main shaft, and clutch shoe 47 is moved into the path of the clutch pin 44. All this occurs, as previously explained, immediately after the clutch pin has passed the clutch shoe so that nearly a complete revolution of shaft 7, during which the brake is applied, occurs before the clutch pin is brought into engagement with the clutch shoe and is withdrawn from the fly-wheel hub to unclutch the wheel from the shaft. This period of brake application slows down the shaft so that when the clutch pin is withdrawn and the shaft is stopped, the stopping shock and strains will be reduced to a minimum. The slowing down of the shaft during this period is further augmented by the opening of the circuit to the driving motor 17 simultaneously with the application of the brake. This opening of the circuit is effected by switch C positioned as shown in Fig. 1 to be opened by the start and stop lever 39 when it drops to the "off" position, shown in dotted lines.

The pilot circuit comprises the lines 75 and 76 connected through the starting box E with the starting and running circuits.

The starting circuit includes line 76, line 81, the starting and stopping switches 79 and 78 respectively located at the stop and start station A, the line 77, the overload switch 82, coil 83, overload switch 84 and return line 75, including the stop switch C. The overload switches 82 and 84 and the coil 83 are located in the starting box E. Closing of the starting circuit energizes coil 83 to move the contactor 85 into engagement with contact points C1 and C2, thus closing the holding circuit which includes line 76, contactor 85, line 80, stop switch 78, line 77, the elements 82, 83 and 84 in the starting box and the return line 75. The starting switch 79 is normally open and when momentarily closed by pressing a button causes the energization of coil 83 which closes the holding circuit for normal running purposes.

As previously stated, the switch C in the motor circuit line 75 is automatically opened by the start and stop lever 39 when released by the magnet B, thereby shutting off the motor simultaneously with the application of the brake to facilitate the slowing down of the shaft 7. It will be apparent that since the switch C is held open by the lever 39 so long as this lever remains in "off" position, it is impossible to start the motor until the lever has been restored to "start" position, thereby releasing the brake and withdrawing the clutch shoe. This insures that the fly-wheel will make less than one revolution before it will become connected by the clutch pin to the shaft, and, consequently, eliminates any possibility of the attainment of considerable momentum by the fly-wheel before the clutch is engaged. This feature precludes injurious shocks and jars to the mechanism which would result were the fly-wheel to attain a high speed prior to being connected with the drive shaft through the clutch pin.

It should be manifest from the foregoing that I have provided a stop motion mechanism which not only insures a stopping of the machine at a predetermined position, but also insures that it will be brought to rest gradually and without the production of injurious shocks and jars inherent in the sudden stopping of a machine of this character. Furthermore, my invention insures against injurious shocks and jars in starting by preventing the starting of the motor until the brake has been released and the clutch pin freed for engagement with the fly-wheel and by insuring that less than one revolution of the fly-wheel can take place before becoming locked in driving relation with the main shaft by the clutch pin.

While I have illustrated and described a preferred embodiment of the invention, obviously the structural details thereof may be varied within considerable limits without departing from the scope of my invention as defined in the following claims.

I claim:

1. The combination of a die press including a shaft, a fly wheel, a spring actuated clutch pin for connecting said shaft and wheel, a clutch shoe for withdrawing said clutch pin from connecting position, an electric motor connected to drive said wheel, a brake for said shaft, and a control lever connected to said brake and to said clutch shoe, of an armature mounted on said lever, electro-magnetic means cooperable with said armature for holding said lever in starting and running position, an electric circuit for energizing said electro-magnetic means, said circuit including a pair of branches each provided with a switch so that the opening of both switches is necessary to effect deenergization of said electro-magnetic means, a detector circuit arranged to open one of said switches upon the occurrence of an abnormality of an operation of the press, and means operable by said shaft for opening the other switch immediately after the clutch pin has passed the clutch shoe to thereby release said lever and cause the application of the brake to said shaft during substantially one revolution of the shaft before the clutch pin is withdrawn by said shoe.

2. The combination with a die press including a shaft, an electric motor for driving said shaft, a clutch pin for establishing a driving connection between said motor and shaft, a clutch shoe for withdrawing said pin from driving position, a brake for said shaft, and a control lever connected to said brake and clutch shoe so as to operate the same simultaneously, of an armature mounted on said lever, an electro-magnet adapted to cooperate with said armature to hold said lever in starting and running position, an electric circuit for energizing said magnet, said circuit including a plurality of parallel branches, a switch in each of said branches, an electric circuit arranged to open one of said switches, said last mentioned circuit including a plurality of detectors, each adapted to close said circuit upon the occurrence of an abnormality, means controlled by said shaft for alternately opening and closing the other of said branch circuit switches at predetermined positions of said shaft, whereby said electro-magnet is deenergized to release said lever and cause the application of said brake at a predetermined interval prior to the withdrawal of said clutch pin, and a switch in the motor circuit arranged to be opened by said lever when in stopped position and to be closed when said lever is moved to "start" and "run" position, whereby the starting of said motor is caused to occur simultaneously with the release of said clutch pin.

3. The combination with a die press including a driving shaft, an electric motor for driving the same, a clutch pin for connecting the motor with the shaft, a shoe for withdrawing said pin, a brake, means for actuating said brake and shoe, and an electric circuit for driving said motor, said circuit including an electromagnet for holding the brake and shoe actuating means in running position, a periodically opened switch and a second switch controlled by a plurality of abnormality detectors, said switches being so connected in the circuit that the circuit is opened to stop the motor only by the opening of both of said switches, the parts being arranged to release the brake and shoe actuating means so as to apply the brake for a predetermined period prior to the withdrawal of the clutch pin by such shoe.

ALLAN M. CAMERON.